US009530566B2

(12) United States Patent
Ishida et al.

(10) Patent No.: US 9,530,566 B2
(45) Date of Patent: Dec. 27, 2016

(54) MULTILAYER CERAMIC ELECTRONIC COMPONENT

(71) Applicant: TDK CORPORATION, Tokyo (JP)

(72) Inventors: Keisuke Ishida, Tokyo (JP); Makoto Endo, Tokyo (JP); Koichi Yamaguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/108,440

(22) PCT Filed: Dec. 19, 2014

(86) PCT No.: PCT/JP2014/083662
§ 371 (c)(1),
(2) Date: Jun. 27, 2016

(87) PCT Pub. No.: WO2015/098728
PCT Pub. Date: Jul. 2, 2015

(65) Prior Publication Data
US 2016/0329151 A1    Nov. 10, 2016

(30) Foreign Application Priority Data

Dec. 25, 2013 (JP) ................................. 2013-266350

(51) Int. Cl.
*H01G 4/012* (2006.01)
*H01G 4/30* (2006.01)
(Continued)

(52) U.S. Cl.
CPC ................ *H01G 4/30* (2013.01); *H01G 4/012* (2013.01); *H01G 4/1227* (2013.01); *H01G 4/248* (2013.01)

(58) Field of Classification Search
None
See application file for complete search history.

(56) References Cited

U.S. PATENT DOCUMENTS

| 8,971,017 | B1* | 3/2015 | Nakamura | H01G 4/012 |
| | | | | 361/301.4 |
| 2006/0198078 | A1* | 9/2006 | Miyauchi | H01G 4/30 |
| | | | | 361/305 |

(Continued)

FOREIGN PATENT DOCUMENTS

| JP | 05-283208 A | 10/1993 |
| JP | 2003-077761 A | 3/2003 |

(Continued)

OTHER PUBLICATIONS

Mar. 31, 2015 Written Opinion issued in International Application No. PCT/JP2014/083662.

*Primary Examiner* — Dion R Ferguson
(74) *Attorney, Agent, or Firm* — Oliff PLC

(57) ABSTRACT

The present invention aims to suppress the cracks and delamination to improve the bending strength of multilayer ceramic electronic component with internal electrode layers wherein the thickness of the internal electrode layer is 0.5 µm or less. The multilayer ceramic electronic component is a laminated body having internal electrode layers and dielectric ceramic layers which are laminated alternately. The internal electrode layers have electrode discontinuity portion. In a part of the electrode discontinuity portion, a dielectric ceramic particle bigger than the thickness of the dielectric ceramic layer is contained when the cross section is observed from the direction perpendicular to the laminating plane of the laminated body. The dielectric ceramic particles have the same crystal structure with the dielectric ceramic particles contained in the dielectric ceramic layers, and contact with at least one internal electrode layers which are opposite to each other with dielectric ceramic layers sandwiched therebetween.

4 Claims, 7 Drawing Sheets

(51) Int. Cl.
*H01G 4/12* (2006.01)
*H01G 4/248* (2006.01)

(56) References Cited

U.S. PATENT DOCUMENTS

| | | | |
|---|---|---|---|
| 2012/0162858 A1* | 6/2012 | Tanaka | H01G 4/1227 361/321.4 |
| 2013/0094118 A1* | 4/2013 | Kim | H01G 4/30 361/301.4 |
| 2013/0286538 A1* | 10/2013 | Kim | H01G 4/30 361/303 |

FOREIGN PATENT DOCUMENTS

| | | |
|---|---|---|
| JP | 2004-342744 A | 12/2004 |
| JP | 2008-198684 A | 8/2008 |
| JP | 2008-258190 A | 10/2008 |

* cited by examiner

MULTILAYER CERAMIC ELECTRONIC COMPONENT

The present invention relates to a multilayer ceramic electronic component.

BACKGROUND

In recent years, as the electronic devices are becoming smaller and thinner, the electronic components equipped in these electronic devices are also required to be downsized. Especially, with regard to the multilayer ceramic capacitor, it is limited by the mounting area of the electronic components and requires a high capacitance in a downsized product according to the needs for thin consumer devices.

Based on such a market demand, the multilayer ceramic capacitor should ensure a capacitance big enough and must be downsized. Here, the electrostatic capacitance of the multilayer ceramic capacitor is represented by formula 1.

$$C = \left(\frac{\varepsilon_r \times \varepsilon_0 \times S}{d}\right) \times n \quad \text{[Formula 1]}$$

C: electrostatic capacitance; $\varepsilon_r$: relative permittivity; $\varepsilon_0$: vacuum permittivity.
S: overlapping area of internal electrodes; d: thickness of the dielectric ceramic layer;
n: number of laminated layers.

As shown in the formula 1, in order to increase the electrostatic capacitance of the multilayer ceramic capacitor, if the overlapping area of the internal electrodes are considered to be almost constant, adjustments can be made to increase the inherent relative permittivity of the ceramic material, to decrease the thickness of the dielectric ceramic layer, or to increase the number of laminated layers by thinning the thickness of the internal electrode layer.

However, as the relative permittivity is an inherent value depending on the substance, large improvement cannot be expected if no new dielectric material is discovered. Therefore, improvements on designs are required such as decreasing the thickness of the internal electrode layers or the thickness of the dielectric ceramic layers. In recent years, a multilayer ceramic capacitor is required which is formed by internal electrode layers and dielectric ceramic layers with a thickness of 0.50 μm or less. And the biggest problem is a technique for suppressing structural defects such as cracks or delamination or the like which tend to occur along with the thinner of the layer in the internal structure.

For example, as a conventional technique to suppress delamination of products such as the multilayer ceramic capacitors, methods have been proposed with the following method in Patent Document 1 as a representative one. That is, generating electrode discontinuity portions in the internal electrode layer, wherein the electrode discontinuity portions are made of dielectric ceramic particles with their sizes grown to the extent of the thickness of the internal electrode layer, and making the electrode discontinuity portions have an anchor function like pillars connecting the dielectric ceramic layers arranged respectively on and under the internal electrode layers.

In addition, Patent Document 2 has disclosed a method to improve the bonding strength between the internal electrode layers and the dielectric ceramic layers by increasing the contact area with the dielectric ceramic layers by disposing acicular segregates in the discontinuity portion of the internal electrode layers, wherein the acicular particles run through the electrode discontinuity portions and bridge the dielectric ceramic layers.

PATENT DOCUMENTS

Patent Document 1: JP-A-2003-77761
Patent Document 2: JP-A-2008-258190

SUMMARY

However, according to the structure disclosed by Patent Document 1, in the multilayer ceramic capacitor comprising an internal electrode layer of about 1.0 m thickness, the effect of suppressing delamination can be expected. But in the multilayer ceramic capacitor comprising an internal electrode layer as thin as 0.5 μm or less, crack may be generated in the interface between the grown dielectric ceramic particles in internal electrode layers and the dielectric ceramic particles whose grain growth is suppressed in the dielectric ceramic layer. Then the cracks extend and at last cause the delamination. Thus, the multilayer ceramic capacitor is not sufficient to be used as the internal structure which has the structural defects suppressed in the recent multilayer ceramic capacitors where the dielectric ceramic layers are thinned and multiplied.

In addition, according to the structure disclosed by Patent Document 2, though an effect of suppressing delamination can be expected, in the multilayer ceramic capacitor comprising an internal electrode layer of about 0.5 μm thickness or less, regarding to the energy which makes the internal electrode particles turn into spherical particles, due to the acicular segregates (with Ba and Ti as the main component) which run through the discontinuity portion of the internal electrode layers are different in the phase from the dielectric ceramic particles forming the dielectric ceramic layers, so the bonding strength between the acicular segregates and the dielectric ceramic particles is not sufficient. As a result, cracks may generate in the interface between the acicular segregates and dielectric ceramic particles. Thus, the multilayer ceramic capacitor is not sufficient to be used as the internal structure which has the structural defects suppressed in the recent multilayer ceramic capacitors where the dielectric ceramic layers are thinned and multiplied.

Herein, the present invention aims to provide a multilayer ceramic electronic component comprising an internal electrode layer of about 0.5 μm or less with improved bending strength by suppressing the spheronization of conductive component in the internal electrode layers, improving the bonding strength between the internal electrode layers and the dielectric ceramic layers and suppressing the generation of cracks and delaminations.

In order to solve the technical problem mentioned above, the multilayer ceramic electronic component according to the present invention is characterized in that it is provided as a laminated body formed by alternatively laminating internal electrode layers and dielectric ceramic layers, and the internal electrode layers mentioned above are provided with electrode discontinuity portions. In a part of the electrode discontinuity portions, the dielectric ceramic particles which are larger than the thickness of the dielectric ceramic layer are contained in the cross section which is perpendicular to the laminating plane of the laminated body. Each of the dielectric ceramic particles mentioned above have the same crystal structure with the dielectric ceramic particles contained in the dielectric ceramic layers and contact with at least one of the internal electrode layers. The internal electrode layers mentioned above are opposite to each other with the dielectric ceramic layers sandwiched therebetween.

The multilayer ceramic electronic component of the present invention is provided with electrode discontinuity portions which include various ceramic particles or void portions, where no conductive component and no ceramic particle exist. Herein, the ceramic particles are dielectric ceramic particles, not confined within the internal electrode layers, but contacting with at least one of the adjacent internal electrode layers which sandwich the dielectric ceramic layers. Therefore, the bonding strength between the particles can be improved and the internal electrode layer can be firmly fixed by the dielectric ceramic particles of the electrode discontinuity portion by disposing the dielectric ceramic particles like building a bridge between the dielectric ceramic layers.

With such a structure mentioned above, the bonding strength can be improved, and the spheronization of the conductive component occurs in the sintering process or the annealing process can be suppressed, and the internal electrode layer can be maintained to be thin. Further, because the expanding energy in the laminating direction caused by the spheronization of the conductive component can be suppressed, the cracks or the peeling (delamination) at the interface between the internal electrode layer and the dielectric ceramic layer can be effectively suppressed. Furthermore, by the grown dielectric ceramic particles being disposed in the internal electrode layers, the strength of the laminated body can be improved, and the voids caused by the spheronization of the conductive component in the internal electrode layers can be reduced. Therefore, the density of the laminated body and the bending strength can be improved.

The dielectric ceramic particles mentioned above and ceramic dielectric particles which form the dielectric ceramic layers have the same crystal structure. As a result, the bonding strength between the dielectric ceramic particles of the electrode discontinuity portions and the dielectric ceramic particles of the dielectric ceramic layers is improved. The cracks and the delamination at the interface between the internal electrode layer and the dielectric ceramic layer can be effectively suppressed.

In the multilayer ceramic electronic component of the present invention, it is preferred that parts of the dielectric ceramic particles contact with the conductive component portion's end portion formed in the electrode discontinuity portion and is grown to be bigger than the dielectric ceramic particles which form the dielectric ceramic layers.

With such a structure mentioned above, since the electrode discontinuity portion and the end portion of the conductive component were tucked with no void portion existing and bridged with the dielectric ceramic layers by the dielectric ceramic particles of the electrode discontinuity portion, the spheronization of the conductive component can be suppressed, and the delamination at the interface of the dielectric ceramic layers can be effectively suppressed. In addition, the particle size of the dielectric ceramic particles which form the electrode discontinuity portion is big so the relative permittivity is large. Since there is no void portion contained, the electrode discontinuity portion can also contribute to the electrostatic capacitance.

In the multilayer type ceramic electronic component of the present invention, it is preferred that the ratio occupied by the electrode discontinuity portion having the dielectric ceramic particles mentioned above in the internal electrode layers is 5% or more and 15% or less when observed from the cross section perpendicular to the laminating plane of the laminated body.

When the electrode discontinuity portion having the dielectric ceramic particles mentioned above is contained in the internal electrode layer with a ratio in the range above, the cracks and the delamination can be effectively suppressed with the electrical properties of the multilayer ceramic electronic component not being deteriorated.

According to the present invention, it is possible to suppress the cracks and delamination for a multilayer type ceramic electronic component with multiple thin layers, specifically, with internal electrode layers of 0.5 μm or less, and improve its bending strength.

DETAILED DESCRIPTION OF EMBODIMENTS

Hereinafter, a multilayer ceramic capacitor will be described as the preferable embodiment of the present invention. The same symbol is provided to the same component with repeated descriptions omitted. In addition, the drawings are schematic that the size ratio among components or the shape of each component may be different from those of the practical samples.

<Multilayer Ceramic Capacitor>

Figure 1:
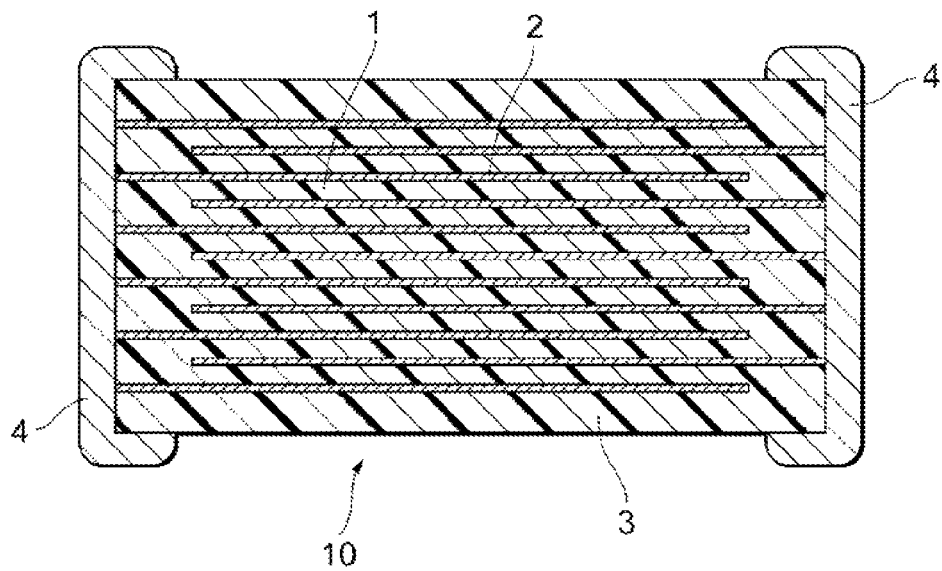
FIG. 1 is a schematic sectional view showing a multilayer ceramic capacitor which is prepared by the preparing method for a multilayer ceramic electronic component according to one embodiment of the present invention.

As shown in FIG. 1, a multilayer ceramic capacitor 10 in one embodiment of the present invention is provided with a laminated body 3 having a structure in which dielectric ceramic layers 1 and internal electrode layers 2 are alternatively laminated. A pair of external electrodes 4 is formed at two end portions of the laminated body 3 to conduct with the internal electrode layers 2 alternatively disposed inside the laminated body respectively. The shape of the laminated body 3 is not particularly restricted and is usually cuboidshaped. In addition, its size is not particularly restricted, and a proper size can be made according to the applications.

(Ceramic Composition of the Dielectric Ceramic Layer)

The composition of the dielectric ceramic layer is not particularly restricted. The composition is preferred to be as follows. That is, $ABO_3$ (representing a perovskite-type crystal where the A site at least contains Ba and the B site at least contains Ti) is used as the main component and the subcomponents contains Mg (0.01 mol or more and 2.00 mol or less when calculated in terms of MgO), oxides of R (R is at least one selected from the group consisting of Y, Dy, Ho, Yb, Lu, Gd and Tb) (0.20 mol or more and 1.00 mol or less when calculated in terms of $R_2O_3$), $SiO_2$ (0.40 mol or more and 2.00 mol or less), oxides of Mn (more than 0.00 mol and less than 0.50 mol when calculated in terms of MnO) and oxides of V (0.01 mol or more and 0.50 mol or less when calculated in terms of $V_2O_5$), wherein, all amounts of the contents is relative to 100 mol of $ABO_3$.

(Preparation of the Multilayer Ceramic Capacitor)

With respect to the method for preparing the multilayer ceramic capacitor 10, a laminated body 3 in a state where organic components are contained can be prepared by some well-known methods including the preparation of a paste for dielectric ceramic, the preparation of a paste for internal electrode, printing, laminating and cutting. Then, in order to carbonize and burn the organic components and to sinter the laminated body 3, a de-binder process, a sintering process and an annealing process are performed. Thereafter, an external electrode 4 is formed on the end face of the sintered laminated body 3. In this way, the multilayer ceramic capacitor 10 is obtained.

(Paste for Dielectric Ceramic)

A dielectric ceramic powder with an average particle size of 20 nm to 100 nm is preferably used in the paste for the dielectric ceramic layer according to one embodiment of the present invention. If the average particle size is controlled within the range, a dense dielectric green sheet can be prepared. And also, in the sintering process, the grain growth of the dielectric ceramic powders can be promoted and the structure of the present invention can be prepared.

(Paste for Internal Electrode)

With respect to the conductive powders in the paste for internal electrode according to one embodiment of the present invention, the particle size is not particularly restricted but a conductive powder with an average particle size of 50 nm to 200 nm is preferably used. In addition, as the dielectric ceramic powder added as a common material to delay the sintering behavior of the conductive powder, a dielectric ceramic powder is preferably used which has the same composition as that used in the paste for dielectric ceramic and has an average particle size of approximately 100 nm to 200 nm. If the average particle size of the common material is controlled within the range, it can react with the dielectric ceramic powder of the dielectric ceramic layer and prepare the structure of the present invention in the electrode discontinuity portion in the sintering process.

The common material with a content of more than 10% or less than 30% is preferably used relative to the conductive powder. The content of the common material is one of the means to control the proportion of the electrode discontinuity portion. The raw material powders used as the common material are preferred to be spherical and with a poor crystallinity. For example, if the crystallinity of the barium titanate powder is calculated as the half width of plane (111) from the X-ray diffraction intensity, it is preferred to be 0.200 or more. If the particle size is big and the crystallinity is good, it will be difficult to react with the dielectric ceramic powder of the dielectric ceramic layers in the sintering process to grow the grains bigger.

Further, in the dielectric ceramic powder which is added to the internal electrode paste as a common material, common materials are preferred to be added to obtain the same composition as the dielectric ceramic layers. The form for adding is not particularly restricted. Torrefaction addition method, coating, organometallic compound addition can be exemplified.

(The Sintering Process)

A special hot press sintering method can be employed as the sintering process in one embodiment of the present invention since the particle size of the common material in the paste for internal electrode used in the present invention is big, and the effect to delay the sintering behavior of the conductive powder cannot be expected. However, the characteristic of the present invention is in the structure, any paste for dielectric ceramic, any paste for internal electrode and various sintering methods can be used as long as the method can produce the structure of the present invention. For example, the roller hearth kiln sintering, the hot isostatic pressing, the batch furnace sintering or the like can be used.

Figure 2:
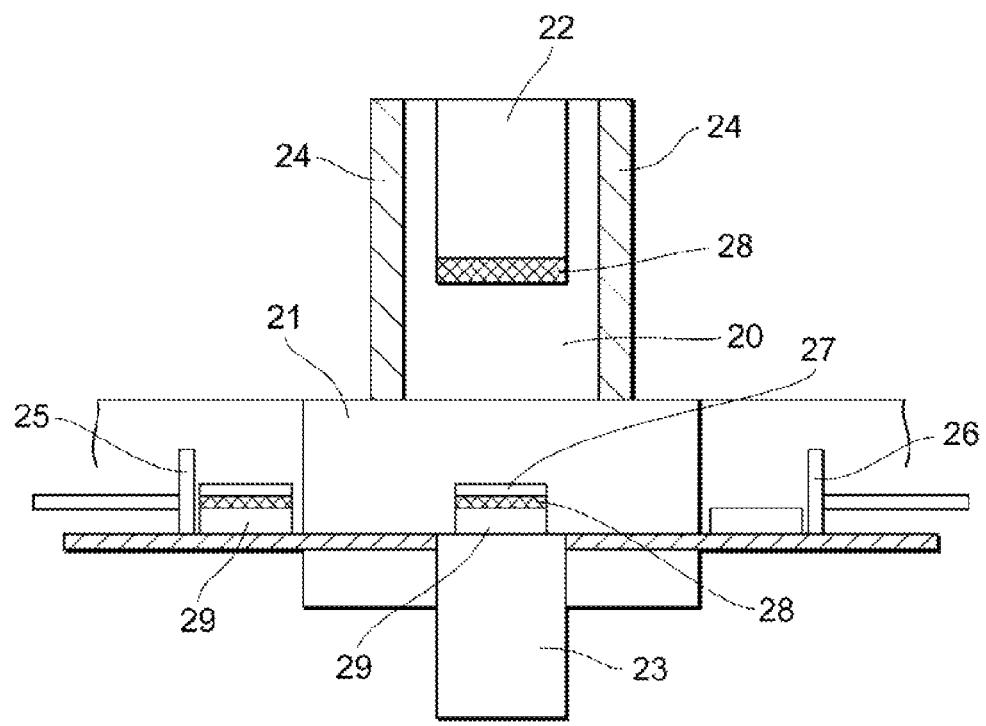
FIG. 2 is a schematic view showing a hot press sintering furnace according to one embodiment of the present invention.
Figure 3:
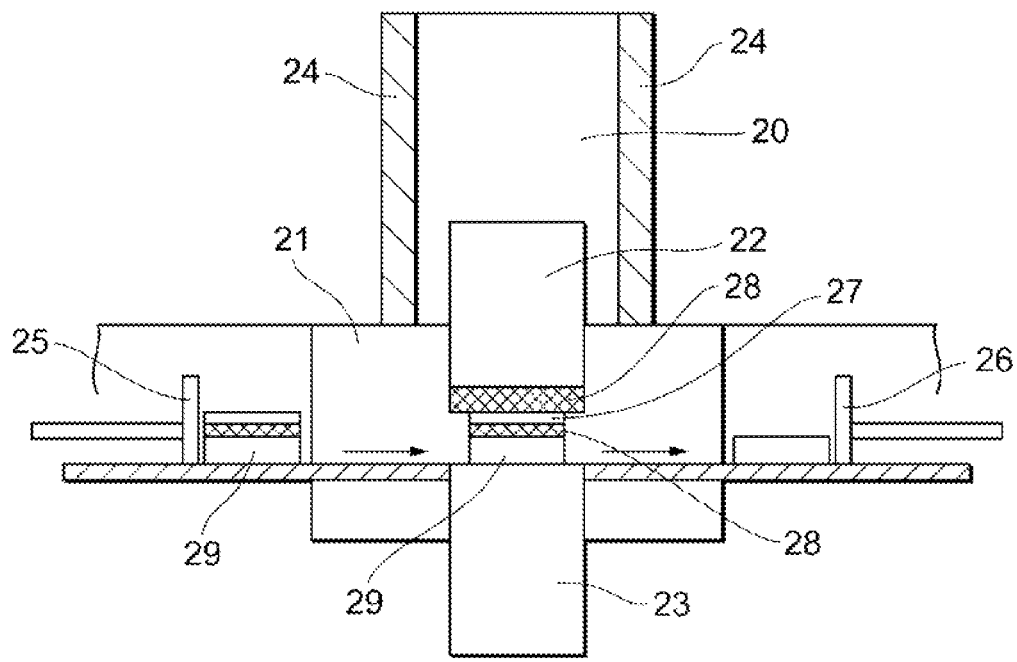
FIG. 3 is a schematic view showing a hot press sintering furnace during sintering according to one embodiment of the present invention.

The hot press sintering device in one embodiment of the present invention is a continuous high-speed hot-press sintering furnace as shown in FIG. 2 and FIG. 3.

As shown in FIG. 2, the continuous high-speed hot-press sintering furnace in one embodiment of the present invention is provided with a chamber to heat the pressure punch 20, a pressurizing chamber 21, a punch 22, a stage 23, a heater 24, a pusher 25 and a receiver 26. The laminated body sample 27 is placed on a high-strength plate 28 which is mounted on a ceramic stand 29 and under the bottom of the punch 22.

As shown in FIG. 3, in the continuous high-speed hot-press sintering furnace of the present invention, the sintering process is performed in which the laminated body sample 27 is transferred to the stage 23 by the pusher 25 and placed on the ceramic stand 29 and the high-strength plate 28, and then pressed and heated with the punch 22 and the high-strength plate 28 which have been heated from 1100° C. to 1300° C. in the chamber to heat the pressure punch 20. The sintered laminated body sample is pushed out of the pressurizing chamber 21 by the receiver 26.

As the conditions for the sintering process, for example, the heating rate can be 7000° C./h or more and 100000° C./h or less, and the pressurization is 1.0 MPa or more and 80 MPa or less.

The atmosphere during sintering is preferably one where nitrogen, hydrogen and vapor are present with the hydrogen concentration being higher than 0.1% and 4.0% or less. If the hydrogen concentration is too high, it is not preferable because the residual carbon from the de-binder process will also be left in the sintering process and the condition for annealing will be shifted to a higher temperature. In contrast, if the hydrogen concentration is too low, the conductive powder will be oxidized, which is not preferable.

As the high-strength plate mentioned above, a material with a high thermal shock resistance and a high bending strength can be listed such as tungsten carbide, silicon carbide, silicon nitride and the like. From the viewpoint of the reactivity with the sample, silicon carbide is preferable.

The pressure punch mentioned above can be made of a material with a high thermal conductivity such as silicon carbide, aluminum nitride and the like. From the viewpoint of the thermal resistance and the thermal conductivity, silicon carbide is preferable.

The ceramic stand mentioned above can be made of a material with a low thermal conductivity such as the stabilized zirconia, alumina, silicon nitride and the like. From the viewpoint of the thermal shock resistance and the thermal conductivity, the stabilized zirconia and silicon nitride are preferably used.

An annealing treatment is provided to the sintered laminated body. The annealing treatment can be performed while pressure is applied inside a hot pressing device. Alternatively, it can be performed in another batch furnace, continuous furnace or the like. In addition, the annealing treatment is usually performed in an atmosphere where nitrogen and water vapor co-exist with the oxygen partial pressure being controlled at $10^{-8}$ atm to $10^{-4}$ atm. In addition the holding temperature is preferably kept at 800° C. to 1100° C. If the holding temperature in annealing is below the temperature range mentioned above, the annealing of the dielectric material will not be sufficient so that the insulation resistance and the life-time properties will deteriorate. Besides, if the temperature is above the range, it is hard to provide the structure of the present invention.

In this way, the structure of the present invention can be obtained by performing the sintering process and the annealing process to the laminated body prepared using the mentioned paste for dielectric ceramic and the paste for the internal electrode. The embodiment of the structure in the present invention will be described with reference to FIG. 4.

Figure 4:
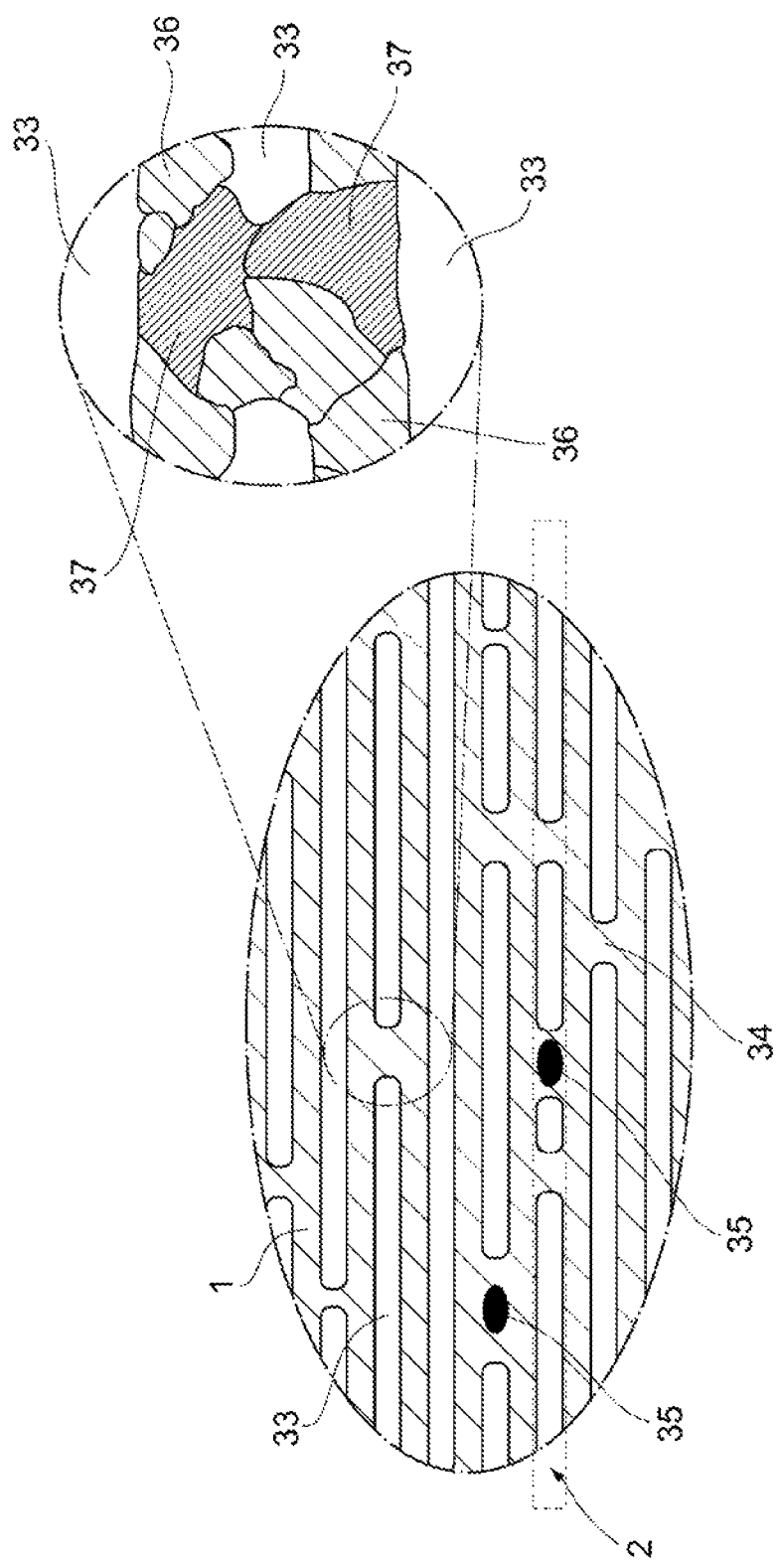
FIG. 4 is a partial sectional view of a multilayer ceramic capacitor showing the internal structure of the multilayer ceramic electronic component of the present invention.
Figure 5:
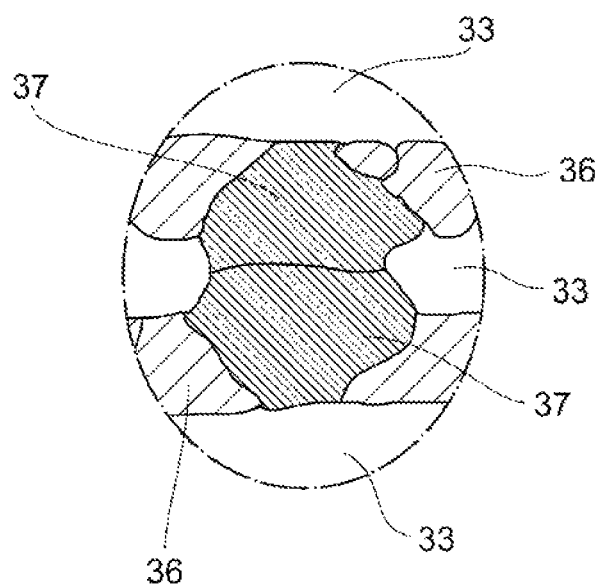
FIG. 5 is one example showing the dielectric ceramic particle of the electrode discontinuity portion in the multilayer ceramic electronic component of the present invention.
Figure 6:
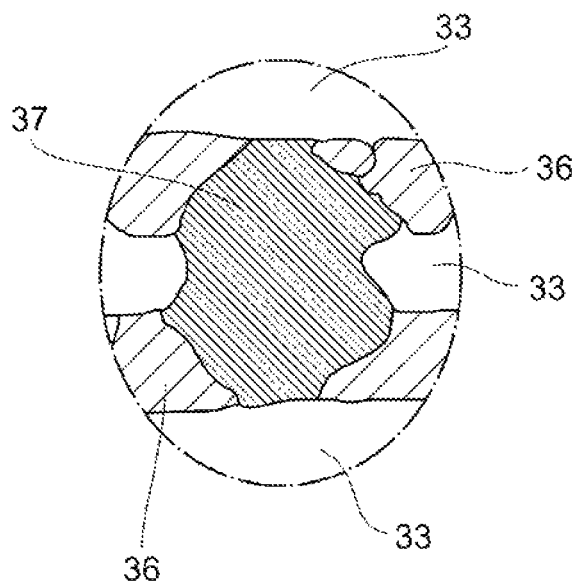
FIG. 6 is one example showing the dielectric ceramic particle of the electrode discontinuity portion in the multilayer ceramic electronic component of the present invention.
Figure 7:
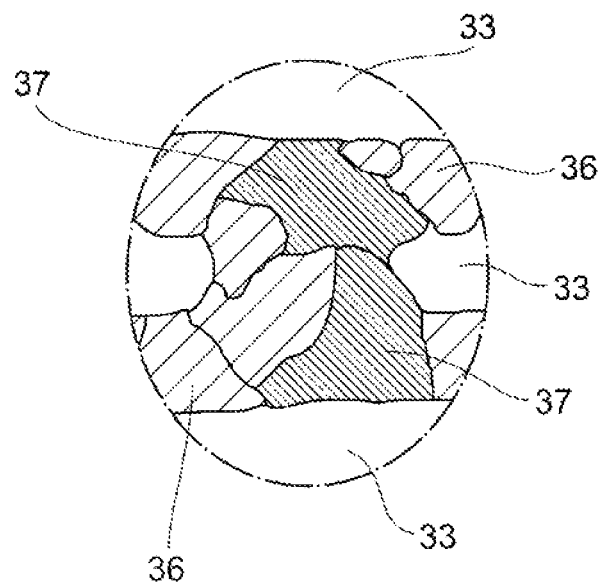
FIG. 7 is one example showing the dielectric ceramic particle of the electrode discontinuity portion in the multilayer ceramic electronic component of the present invention.
Figure 8:
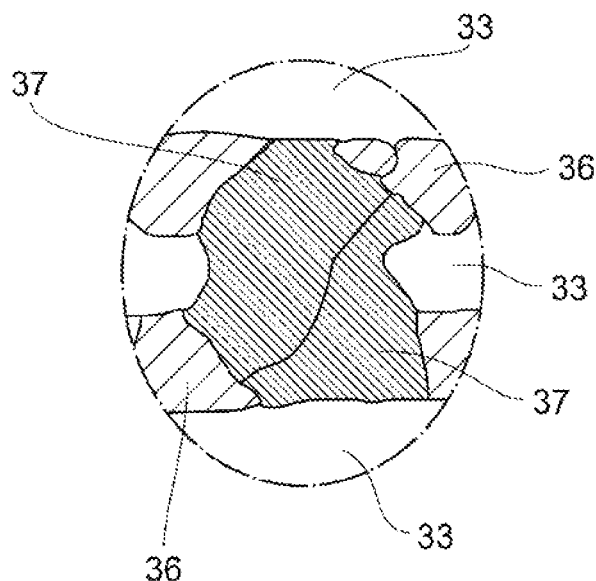
FIG. 8 is one example showing the dielectric ceramic particle of the electrode discontinuity portion in the multilayer ceramic electronic component of the present invention.

FIG. 4 is an enlarged view of a part of the internal structure in the schematic sectional view of the multilayer ceramic capacitor shown in FIG. 1.

In general, if the cross-section showing the internal structure of the multilayer ceramic capacitor is enlarged, as shown in FIG. 4, the capacitor is composed of dielectric ceramic layers 1 and internal electrode layers 2. The internal electrode layers 2 are composed of electrode discontinuity portions and conductive component portions 33. Further, the electrode discontinuity portion is composed of at least one selected from ceramic portion 34 and void portions 35, wherein, the ceramic portion 34 is composed of dielectric ceramic particles which form the dielectric ceramic layers 1 or similar ceramic particles and the void portions 35 is a portion where no conductive component or ceramic particle exists.

In addition, in the ceramic portion 34 of the electrode discontinuity portion, several kinds of particles co-exist, such as the dielectric ceramic particles 36 or the segregated oxide particles of the common material, the ceramic particles transferred from the main phase of the dielectric ceramic particles and glass ingredients. Here, the dielectric ceramic particles are the ceramic particles showing ferro-electricity, and the ceramic particles refer to all the ceramic particles including particles in an unknown state.

Here, in a part of the ceramic portion 34 of electrode discontinuity portion, dielectric ceramic particles 37 are contained. Each of the dielectric ceramic particles 37 contacts with at least one of the internal electrode layers 2, wherein, the internal electrode layers 2 are opposite to each other with dielectric ceramic layers 1 sandwiched therebetween.

Moreover, the composition of dielectric ceramic particles 37 in the electrode discontinuity portion mentioned above is preferred to be the same as that of the main phase particles in the dielectric ceramic layers 1 where $ABO_3$ (representing a perovskite-type crystal where the A site at least contains Ba and the B site at least contains Ti) is used as the main component.

FIG. 5 to FIG. 8 show a part of the structure of the ceramic portion in the electrode discontinuity portion according to one embodiment of the present invention.

As shown in FIG. 5 to FIG. 8, if a ceramic portion containing dielectric ceramic particles 37 is contained, after the conductive component of the internal electrode layers is sintered in the thermal treatment process, the spheronization of conductive component can be suppressed, and the internal electrode layers can be thinner substantially relative to the energy by firmly fixing the dielectric ceramic layers, wherein, the energy is going to spheroidize the internal electrode layers. Here, each of the dielectric ceramic particles 37 mentioned above contacts with at least one of the internal electrode layers 2 (FIG. 4), wherein, the internal electrode layers 2 are opposite to each other with dielectric ceramic layers 1 sandwiched therebetween.

In addition, as shown in FIG. 5 to FIG. 8, because the dielectric ceramic particles 37 have the same composition with the main phase particles of the dielectric ceramic layers 1, in which $ABO_3$ (representing a perovskite-type crystal where the A site at least contains Ba and the B site at least contains Ti) is used as the main component, the bonding strength between the dielectric ceramic particles 37 and the dielectric ceramic particles in the dielectric ceramic layers is strong, the spheronization of the conductive component in the internal electrode layers after sintered in the sintering process and annealing process can be suppressed, and the cracks and delamination can be suppressed. Herein, each of the dielectric ceramic particles 37 contacts with at least one of the internal electrode layers 2 (FIG. 4), wherein, the internal electrode layers 2 are opposite to each other with dielectric ceramic layers 1 sandwiched therebetween.

Furthermore, because the strength of the laminated body can be improved by containing the dielectric ceramic particles in the internal electrode layers, and the voids caused by the spheronization of the conductive component in the internal electrode layers can be reduced, the density of the laminated body is improved and the bending strength is improved, too.

Then, as shown in FIG. 5 to FIG. 8, the dielectric ceramic particles 37 contact with the electrode end part of the conductive component portions 33 in the electrode discontinuity portion, and further contact with at least one of the counter electrodes, thus, the internal electrode layers can be tucked using the dielectric ceramic particles with no void portion existing between them, and the delamination at the interface between the internal electrode layers and the dielectric ceramic layers can be effectively suppressed. Herein, each of the dielectric ceramic particles 37 contacts with at least one of the internal electrode layers 2 (FIG. 4), wherein, the internal electrode layers 2 are opposite to each other with dielectric ceramic layers 1 sandwiched therebetween.

Furthermore, it is preferred that the ratio occupied by the electrode discontinuity portion having the dielectric ceramic particles 37 in the internal electrode layers 2 is 5% or more and 15% or less when observed from the cross section perpendicular to the laminating plane of the laminated body.

The structure of the electrode discontinuity portion in the present invention is different from the elements which constitute the conventional electrode discontinuity portion such as voids, segregated particles or abnormally grain-grown ceramic particles. It is composed of the same crystal structure as the main phase particles of the dielectric ceramic layers. The electrode discontinuity portion in the present invention can bring a significant effect of suppressing the cracks and delamination and improving the bending strength by being contained in a small ratio of 5% to 15% and contacting with at least one of the internal electrode layers which are opposite to each other with a dielectric ceramic layer sandwiched therebetween.

Herein, the ratio occupied by the electrode discontinuity portion of the present invention in the internal electrode layers 2 means the ratio of the total length of the electrode discontinuity portion relative to the total length of internal electrode layers 2 in the field of view. The total lengths can be calculated by the following method, i.e., drawing a center line in a horizontal direction regarding to the thickness of the internal electrode layers 2, and then calculate the length of horizontal line and the length of the electrode discontinuity portion on the horizontal line.

In addition, the shape of the dielectric ceramic particles existing in a part of the electrode discontinuity portion is preferred to be irregular.

Here, the shape of the particle shape is irregular refers that the observed cross section shape of the dielectric ceramic particles is not a simple shape with regularity such as round, square or rectangle when observe the multilayer ceramic electronic component by cutting down a cross section vertically relative to the laminating plane, but is a shape having vertexes and edges with irregular space, preferably polygons.

By the irregularly shaped particles mentioned above, the contacting area between particles can be increased, the bonding strength between the particles can be improved, the internal electrode layers can be firmly fixed by the electrode discontinuity portions, and the cracks and delamination can be effectively suppressed.

By obtaining the structure mentioned above, the suppressing for the occurrence of delamination and the bending strength can be greatly improved in the multilayer ceramic electronic component with the average thickness of the internal electrode layers 2 being 0.5 μm or less when compared with the conventional structure.

The embodiment of the present invention has been described above. However, the present invention is not limited to the foregoing embodiment and can be modified in various ways without departing the spirit and scope of the present invention. For example, it can be used in multilayer ceramic electronic components such as multilayer chip thermister, multilayer inductor, multilayer piezoelectric element, multilayer varistor and so on.

EXAMPLES

Hereinafter, the present invention will be further described below based on detailed examples, and various modifications can be made without departing from the spirit and scope of the present invention.

(Preparation of the Dielectric Ceramic Powders)

Raw materials were prepared with the element ratio of Ba:Ca being 96:4, and Ti:Zr being 94:6 respectively using $BaCO_3$, $CaCO_3$, $TiO_2$, and $ZrO_2$, and were pulverized with beads mill after sintering them in the atmosphere under 700° C. to obtain barium calcium zirconate titanate particles of 50 nm.

Sub-materials were prepared with a composition of 0.1 mol Mg, 0.2 mol of Mn, 0.1 mol of V, 0.8 mol of Y, 1.3 mol of Si, 0.7 mol of Ba and 0.5 mol of Ca relative to 100 mol of barium calcium zirconate titanate mentioned above. As the raw materials, MgO was used as Mg, $MnCO_3$ was used as Mn, $V_2O_5$ was used as V, $Y_2O_3$ was used Y. And $SiO_2$, $BaCO_3$ and $CaCO_3$ were used as Si, Ba and Ca respectively.

These sub-materials were prepared into glass micro powders by mixing, pulverizing and calcining.

(Preparation of the Paste for Internal Electrodes)

The following materials were prepared, i.e., a Ni powder (with an average particle diameter of 150 nm), a barium calcium zirconate titanate based dielectric ceramic powder with an average particle diameter of 150 nm made by the method mentioned above except that the calcining temperature was changed to 800° C., and various organometallic compounds and organic vehicles used as sub-material to obtain an identical composition with the dielectric ceramic powder.

The Ni powder, the barium calcium zirconate titanate based dielectric ceramic powder, and the various organometallic compounds and organic vehicles used as sub-materials were mixed using a homo-mixer. After that, they were performed with a dispersing treatment for 30 minutes using an ultrasonic homogenizer.

Then, the solution was evaporated to some extent using an evaporator to obtain an inorganic solid concentration of 40% by mass in the paste. After that, the paste for internal electrodes was prepared by kneading using a three-roll mill to adjust the viscosity.

(Preparation of the Multilayer Ceramic Capacitor)

First, in order to form the dielectric green sheets for constituting the dielectric ceramic layers, a paste for dielectric ceramic layers containing the barium calcium zirconate titanate based dielectric ceramic powder was prepared.

As for the paste for dielectric ceramic layers, the dielectric ceramic powders and an organic vehicle were mixed using a homo-mixer. After that the mixture was mixed with dispersing agents and pulverized and mixed for 16 hours using zirconia beads of 0.5 mm to obtain the paste for dielectric ceramic layers.

After that a dielectric green sheet was formed on a carrier film functioning as a support by a slot-die coating method using the paste for dielectric ceramic layers above.

Then, in order to form the internal electrode layer, the paste for internal electrode was used to form an internal electrode pattern on the dielectric green sheet by screen printing and then dried.

Further, the ceramic paste for blank space was coated on the concave portion in the internal electrode patterns and then dried. In this way, a green sheet for internal layer was prepared.

In addition, besides the green sheet for internal layer, a green sheet for outer layer was prepared separately with only a dielectric green sheet formed on the carrier film.

Then, the green sheet for internal layer was laminated on the green sheet for outer layer. After that, the carrier film was peeled off.

Further, green sheets for internal layer were laminated repeatedly to a specific number of laminated layers. After laminating a green sheet for outer layer at last, a hot pressing was performed to obtain the laminated body before sintered.

The obtained laminated body was cut by a dicing saw.

Thereafter, the cut individual pieces of the laminated body were arranged on a high-strength plate with a spacing of 0.1 mm, and a de-binder process was performed to the individual pieces together with the high-strength plate.

In the present examples, silicon carbide was used as the high-strength plate.

The condition for de-binder process was that the holding temperature was 800° C., and the holding time was 12 hours at a humidified nitrogen-hydrogen mixed gas atmosphere with a hydrogen concentration of 4.0%. The heating rate was not particularly restricted, and the process was performed until the residual carbon content turned to be 0.1 mass % or less.

The obtained laminated chips after the de-binder process on the high-strength plate were sintered at a condition with a heating rate of about 86400° C./h, a sintering temperature of 1160° C. and an applied pressure of 10 MPa using a hot press sintering device as shown in FIG. 2.

The atmosphere during sintering was a humidified mixed gas of nitrogen and hydrogen with an oxygen partial pressure of $10^{-11}$ atm.

As the materials for the jig of the hot press sintering device mentioned above, in the present examples, silicon carbide was used for the pressure punch and silicon nitride was used for the ceramic stand.

An annealing treatment was provided to the sintered laminated body sintered in this way. In the present invention, the annealing treatment was performed in a non-pressure batch furnace at an atmosphere controlled at $10^{-5}$ atm where nitrogen and water-vapor co-existed. In addition, the holding temperature was 1050° C.

An end face polishing was performed to the obtained laminated body (sintered chips) using barrel finishing. After the paste for Cu terminal electrodes was coated, it was baked onto the end faces to form the terminal electrodes. Thereby, the multilayer ceramic capacitor having the structure of the present invention was prepared.

(Evaluation on the Multilayer Ceramic Capacitor)

The particle shape, the composition of ceramic particles constituting the ceramic portion of the electrode discontinuity portions, the ratios in the ceramic portion of the electrode discontinuity portions, the frequency of delamination, the frequency of cracks and the bending strength were evaluated by the following evaluation methods for the obtained multilayer ceramic capacitors.

(Evaluation on the Particle Shape of the Ceramic Particles Constituting the Ceramic Portion)

A cross-section of the obtained multilayer ceramic capacitor was observed using a field emission scanning electron microscope (FE-SEM) at a magnification of 5000. After the ceramic portion of the electrode discontinuity portion was determined, the shape of the constituting particles was evaluated under a magnification of 30000 and 40000.

In this example, with respect to all of the evaluated examples, it was confirmed that there were ceramic particles in the electrode discontinuity portion wherein each of the ceramic particles contacted with at least one of the internal electrode layers which were opposite to each other with the dielectric ceramic layers sandwiched therebetween.

(Evaluation on the Composition of Ceramic Particles Constituting the Ceramic Portion)

The evaluation on the composition of ceramic particles with respect to the present invention was performed by observing the ceramic particles in the ceramic portion of the cross-section of the prepared multilayer ceramic capacitor using a scanning transmission electron microscope (STEM), and then performing an energy dispersive spectroscopy (EDS) analysis.

In the present examples, it was confirmed that all the evaluated ceramic particles were dielectric ceramic particles as same as the main phase particles in the dielectric ceramic layers. Each of the evaluated ceramic particles contacted with at least one of the internal electrode layers which are opposite to each other with the dielectric ceramic layers sandwiched therebetween.

(Evaluation on the Thickness of Internal Electrode Layers)

A cross-section of the obtained multilayer ceramic capacitor was observed using a field emission scanning electron microscope (FE-SEM) at a magnification of 2500. The thickness of internal electrode layers was evaluated.

In the present examples, with regard to all of the evaluated samples, it was confirmed that the average thickness of the internal electrode layers in the visual field were 0.5 µm or less.

(Evaluation on the Ratio of the Electrode Discontinuity Portion)

A cross-section of the obtained multilayer ceramic capacitor was observed using a field emission scanning electron microscope (FE-SEM) at a magnification of 2500. The ratio of the electrode discontinuity portions was evaluated. In the present examples, the electrode discontinuity portions mentioned in the following table 1 and table 2 referred to the electrode discontinuity portions which contained dielectric ceramic particles having the following characters. That is, when a cross section perpendicular to the laminating plane of the laminated body was observed, each of the dielectric ceramic particles was thicker than the dielectric ceramic layer, had the same crystal structures with the dielectric ceramic particles which formed the dielectric ceramic layers, and contacted with at least one of the internal electrode layers which were opposite to each other with the dielectric ceramic layers sandwiched therebetween.

Here, the ratio occupied by the electrode discontinuity portions in the internal electrode layers is the ratio of the length of the electrode discontinuity portion relative to the length of the internal electrode layers in the field of view. The length of the internal electrode layers and the length of the electrode discontinuity portion were calculated by the following method. That is, by drawing a center line regarding to the thickness of the internal electrode layers in the horizontal direction, the total length of the horizontal line was deemed as the length of the internal electrode layer and the sum of the lengths of the electrode discontinuity portions in the horizontal line was deemed as the length of the electrode discontinuity portions.

(Evaluation on the Structural Defect)

The six surfaces of the prepared multilayer ceramic capacitor and a cross section where the external electrodes can be observed were observed using a laser microscope (manufactured by Olympus) at a magnification of 20. And the frequencies of the cracks and the delaminations were evaluated respectively.

(Bending Strength Experiments)

The three point bending strength was measured for the prepared multilayer ceramic capacitor. The conditions for measuring were as follows, i.e., the distance L between the fulcrums was 0.5 mm, the loading rate was 1 mm/sec. The bending strength F of the multilayer ceramic capacitor was calculated from the load P when breaking occurred and the formula below.

$$F=(3 \times P \times L)/(2 \times w \times t^2)$$

Wherein, w was the width of the multilayer ceramic capacitor, t was the thickness of the multilayer ceramic capacitor. The bending strengths F of 100 multilayer ceramic capacitors were measured and their average value was calculated.

(Measuring for Electrostatic Capacitance)

The electrostatic capacitances were measured for the chips of the prepared multilayer ceramic capacitors 10 by an LCR meter (4284A, prepared by HP Company) under a condition of 1 kHz and 1.0 Vrms. The average value was compared to perform the evaluation.

Figure 9:
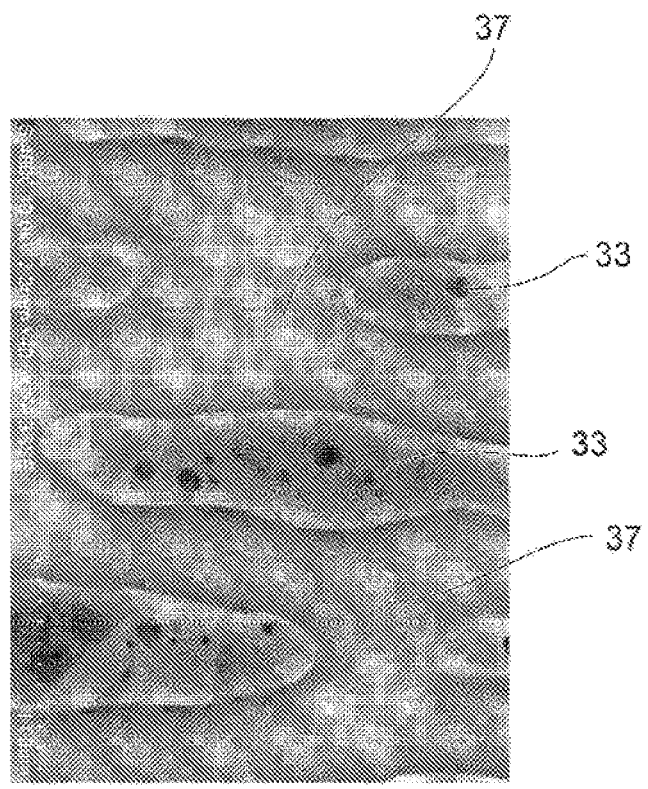
FIG. 9 is a field emission-scanning electron microscope (FE-SEM) image (40000×) of the sample of Example 1.

FIG. 9 showed an FE-SEM image of a cross section in the ceramic portion of the electrode discontinuity portion of Example 1. As shown in FIG. 9, it was confirmed that in the electrode discontinuity portions of the internal electrode layers, there were dielectric ceramic particles 37 which were larger than the thickness of the dielectric ceramic layer. The dielectric ceramic particles 37 contacted with at least one of the conductive component potions 33 of the internal electrode layers which were opposite to each other with the dielectric ceramic layers sandwiched therebetween.

Samples of Example 2 and Example 3 were prepared by the same processes as Example 1 except the following items, i.e., the amounts of the printed paste for internal electrode were reduced in both examples in order to decrease the thicknesses of the internal electrode layers; and further set the sintering holding temperature as 1130° C., the applied pressure as 20 MPa, and the holding temperature for the annealing treatment as 1000° C. in Example 2 to adjust the ratio of the electrode discontinuity portions or the like.

In addition, the sintering holding temperature was set as 1140° C., the applied pressure was set as 15 MPa, and the temperature for the annealing treatment was set as 1000° C. in Example 3 to prepare the sample.

Comparative Examples

Comparative Example 1 was the sample produced by the method shown in patent document 1. However, when the materials and the powders in patent document 1 were used, the thickness of internal electrode layers cannot be less than 0.5 μm, thus, the sample was prepared using the dielectric ceramic materials and the paste for internal electrode as shown below.

As the dielectric ceramic materials, barium titanate particles with an average particle size of 200 nm were used. As the composition of the materials, with respect to 100 mol of barium titanate, 1.0 mol of Mg in terms of MgO, 0.60 mol of oxides of Y in terms of $Y_2O_3$, 0.80 mol of $SiO_2$, 0.30 mol of oxides of Mn in terms of MnO, and 0.20 mol of oxides of V in terms of $V_2O_5$ were used.

The paste for the dielectric ceramic layers was prepared using the dielectric ceramic materials and the composition mentioned above by the same method as the Examples.

The paste for internal electrodes was prepared using Ni powders (with an average particle diameter of 150 nm) and barium titanate with a size of 20 nm by the same method as the Examples.

The printing, laminating, cutting and de-binder processes were performed by the same method as the Examples using the paste for dielectric ceramic layers and the paste for the internal electrodes.

The sample prepared by the method mentioned and the following de-binder process was sintered at a sintering temperature of 1200° C. with a heating rate of 600° C./h. Then the following processes were the same as in the Examples.

Figure 10:
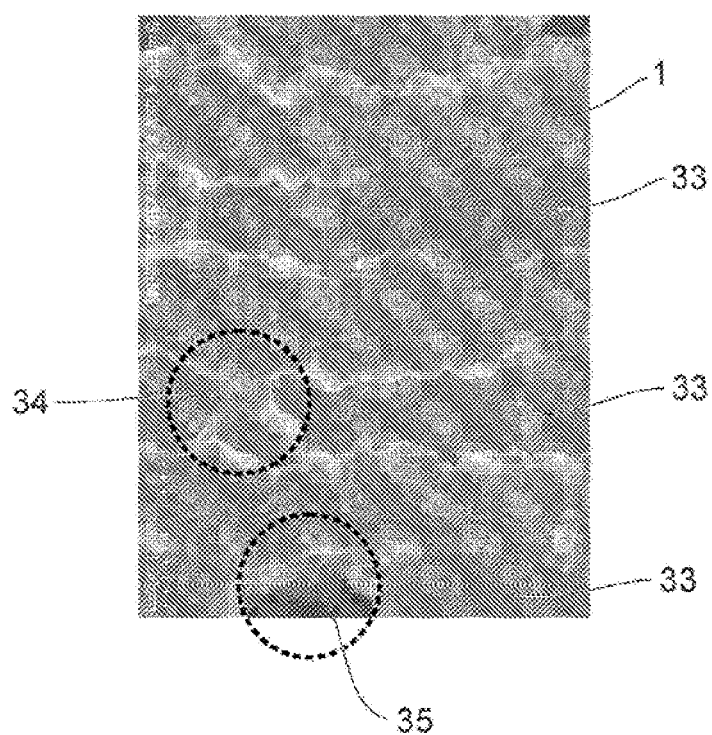
FIG. 10 is a field emission-scanning electron microscope (FE-SEM) image (30000×) of the sample of Comparative Example 1.

FIG. 10 showed an FE-SEM image of a cross section of Comparative example 1. The structure itself was obtained as the structure mentioned in Patent document 1, but the electrode discontinuity portion of the present invention cannot be found.

Comparative example 2 is the sample prepared by the method as shown in Patent document 2. However, when the internal electrode of Patent document 2 was used, the thickness of the internal electrode layers cannot be less than 0.5 μm, thus, the sample was prepared using the dielectric ceramic materials and the paste for internal electrodes as shown below.

As the dielectric ceramic materials, barium titanate particles with an average particle size of 200 nm were used. As the composition of the materials, with respect to 100 mol of barium titanate, 1.9 mol of Mg in terms of MgO, 0.54 mol of oxides of Y in terms of $Y_2O_3$, 0.50 mol of $BaSiO_3$, 0.21 mol of oxides of Cr in terms of $Cr_2O_3$, and 0.08 mol of oxides of V in terms of $V_2O_5$ were used.

The paste for the dielectric ceramic layers was prepared using the dielectric ceramic materials and the composition mentioned above by the same method as the Examples.

The paste for internal electrodes was prepared using Ni powders (with an average particle diameter of 150 nm) and barium titanate with a size of 20 nm by the same method as the Examples.

The printing, laminating, cutting and de-binder processes were performed by the same method as the Examples using the paste for dielectric ceramic layers and the paste for the internal electrodes.

The sample prepared by the method mentioned and the following de-binder process was sintered at a sintering temperature of 1200° C. with a heating rate of 600° C./h. Then the following processes were the same as in the Examples.

According to the method above mentioned, the structure itself was obtained as the structure mentioned in Patent document 2. The acicular particles are the oxides of the Ba—Ti—Mg—Ni—Cr phase, but the electrode discontinuity portion of the present invention could not be found.

The evaluation results of Examples 1 to 3 and Comparative examples 1 and 2 were shown in Table 1.

TABLE 1

| | Thickness of the internal electrode layers (μm) | Presence of the voids in the end portion of the conductive component portion in the electrode discontinuity portion | The amount of the ceramic particles in the internal electrode paste Weight % vs Ni 100% | The ratio of electrode discontinuity portion (%) | The frequency of cracks | The frequency of delamination | Bending strength (MPa) | Electrostatic capacitance (μF) |
|---|---|---|---|---|---|---|---|---|
| Example 1 | 0.5 | Yes | 10 | 18 | 0/100 | 0/100 | 415 | 4.4 |
| Example 2 | 0.3 | No | 10 | 9 | 0/100 | 0/100 | 401 | 5.0 |
| Example 3 | 0.3 | No | 10 | 18 | 0/100 | 0/100 | 431 | 4.8 |
| Comparative example 1 | 0.5 | Yes | 10 | 19 | 15/100 | 44/100 | 326 | — |

TABLE 1-continued

| | Thickness of the internal electrode layers (μm) | Presence of the voids in the end portion of the conductive component portion in the electrode discontinuity portion | The amount of the ceramic particles in the internal electrode paste Weight % vs Ni 100% | The ratio of electrode discontinuity portion (%) | The frequency of cracks | The frequency of delamination | Bending strength (MPa) | Electrostatic capacitance (μF) |
|---|---|---|---|---|---|---|---|---|
| Comparative example 2 | 0.5 | Yes | 0 | 18 | 29/100 | 6/100 | 311 | — |

As shown in the Example 1 of Table 1, the prepared sample obtained according to the present invention with ceramic particles having the following characters existing could have a significant improvement in the frequencies of cracks and delamination and also an increase in the bending strength when compared with the prior arts even if the thickness of the internal electrode layers became 0.5 μm or less, wherein each of the ceramic particles contacted with at least one of the internal electrode layers which were opposite to each other with the dielectric ceramic layers sandwiched therebetween.

The samples of Example 2 and Example 3 are the samples with a ceramic particle having the following characters existing in the electrode discontinuity portions. The ceramic particle mentioned above was not confined within the internal electrode layers, but contacted with at least one of the adjacent internal electrode layers and contacted with the end portion of the conductive component with no void portion sandwiched, wherein the ceramic particle mentioned above was grain-grown to be bigger than the dielectric ceramic particles which form the dielectric ceramic layers. Although the internal electrode layers were thinned to be about 0.3 μm and spheronization of conductive component would occur easily in the annealing treatment, no cracks or delamination could be observed in 100 samples as shown in Table 1.

In addition, in Example 2 and Example 3, electrostatic capacitance was improved by about 10%. In Example 2, the ratio of electrode discontinuity also contributed to the electrostatic capacitance while it was confirmed in Example 3 that the ratio of the electrode discontinuity portion improved the electrostatic capacitance by an equal extent. It was because that a larger capacitance could be obtained by depositing a particle composed of one particle which contacted with the end portion of the internal electrodes formed in the electrode discontinuity portion which bridged the electrode faces of the internal electrode layers with electrode discontinuity portions formed and the internal electrode layers which was opposite to the above internal electrode layers with the dielectric ceramic layers sandwiched therebetween.

In Examples 4 to 9, samples with the ratio of the electrode discontinuity portion being controlled were prepared in order to observe the effect of the ratio of the electrode discontinuity portion which contained dielectric ceramic particles having the following features. That is, when a cross section perpendicular to the laminating plane of the laminated body was observed, each of the dielectric ceramic particles was larger than the thickness of the dielectric ceramic layer, had the same crystal structures with the dielectric ceramic particles which formed the dielectric ceramic layers, and contacted with at least one of the internal electrode layers which were opposite to each other with the dielectric ceramic layers sandwiched therebetween.

In the control of the ratio of the electrode discontinuity portion in the present invention, the added amount of barium calcium zirconate titanate based dielectric ceramic powders with an average particle diameter of 150 nm which was contained in the internal electrode paste, the conditions for the sintering and annealing processes were adjusted.

In addition, the printed amount of paste for internal electrode was adjusted together with the added amount of the dielectric ceramic powders contained in the internal electrode paste to obtain a thickness of the internal electrode layer of 0.31 μm.

In Example 4, Example 6 and Example 9, the holding temperature for sintering was set as 1140° C. respectively. In Example 5, the temperature was set as 1130° C.

In Example 4 and Example 5, the applied pressure was set as 20 MPa respectively. In Example 6 and Example 7, the applied pressure was set as 15 MPa respectively. In Example 8 and Example 9, the applied pressure was set as 10 MPa respectively.

In Examples 4 to 9, the holding temperature for the annealing process was set as 950° C. respectively.

The evaluation results of Examples 4 to 9 were shown in Table 2.

TABLE 2

| | Thickness of the internal electrode layers (μm) | Amount of the ceramic particles in the internal electrode layers Weight % vs Ni 100% | The ratio of the electrode discontinuity portion (%) | The frequency of cracks X(number)/1000 | The frequency of delamination X(number)/1000 | Bending strength (MPa) |
|---|---|---|---|---|---|---|
| Example 4 | 0.3 | 7 | 3 | 2/1000 | 15/1000 | 360 |
| Example 5 | 0.3 | 10 | 5 | 1/1000 | 3/1000 | 366 |
| Example 6 | 0.3 | 10 | 11 | 0/1000 | 0/1000 | 410 |
| Example 7 | 0.3 | 15 | 14 | 1/1000 | 0/1000 | 432 |

TABLE 2-continued

| | Thickness of the internal electrode layers (μm) | Amount of the ceramic particles in the internal electrode layers Weight % vs Ni 100% | The ratio of the electrode discontinuity portion (%) | The frequency of cracks X(number)/1000 | The frequency of delamination X(number)/1000 | Bending strength (MPa) |
|---|---|---|---|---|---|---|
| Example 8 | 0.3 | 15 | 15 | 2/1000 | 0/1000 | 428 |
| Example 9 | 0.3 | 16 | 16 | 8/1000 | 0/1000 | 425 |

As shown in Table 2, it could be confirmed that when the ratio occupied by the electrode discontinuity portion according to the present invention in the internal electrode layers was 5% or more and 15% or less, the prepared sample obtained according to the present invention with a ceramic particle having the following characters existing could have a very small frequency of cracks and a very small frequency of delamination even if the frequency of cracks was calculated with the parameter being 1000. Herein, the ceramic particle mentioned above contacted with at least one of the internal electrode layers which were opposite to each other with the dielectric ceramic layers sandwiched therebetween.

In addition, as shown in Table 2, it was confirmed that if the ratio of the electrode discontinuity portion in the present invention was increased, the frequency of cracks was increased by a little, and the bending strength was increased. It was considered to be caused by that even if the stiffness was increased due to that the electrode discontinuity portion was composed of the dielectric ceramic particles of the present invention, the internal stress might become large and cracks might be increased if the electrode discontinuity portions became more.

As mentioned above, it is known that structural defects such as cracks and delamination were greatly suppressed and the bending strength was improved in the present invention which had the electrode discontinuity portions with the dielectric ceramic particles having the following characters even if the thickness of the internal electrode layers was reduced to 0.5 μm or below. Herein, the ceramic particle mentioned above contacted with at least one of the internal electrode layers which were opposite to each other with the dielectric ceramic layers sandwiched therebetween.

The multilayer ceramic electronic component in the present invention suppresses the structure defect and ensures a high reliability even if the thickness of internal electrode layers is extremely thin. Thus, it is very meaningful as the structure of the electronic components which are thin and multilayered. For example, if the multilayer ceramic electronic component of the present invention is a multilayer ceramic capacitor, a multilayer ceramic capacitor with high capacitance can be obtained. Therefore, the multilayer ceramic capacitor with the present structure can be used for the applications such as the decoupling purpose, waveform shaping purpose, filtering purpose, smoothing purpose, and bypassing purpose of various communication devices.

DESCRIPTION OF REFERENCE NUMERALS

1 Dielectric ceramic layer
2 Internal electrode layer
3 Laminated body
4 External electrode
10 Multilayer ceramic capacitor
20 Chamber to heat the pressure punch
21 Pressurizing chamber
22 Punch
23 Stage
24 Heater
25 Pusher
26 Receiver
27 Sample of laminated body
28 High-strength plate
29 Ceramic stand
33 Conductive component portion
34 Ceramic portion
35 Void portion
36 Dielectric ceramic particle
37 Dielectric ceramic particle which is larger than the thickness of dielectric ceramic layer

What is claimed is:

1. A multilayer ceramic electronic component which is a laminated body comprising internal electrode layers and dielectric ceramic layers, characterized in that,
the internal electrode layers and the dielectric ceramic layers are laminated alternately,
the internal electrode layers have an electrode discontinuity portion,
in a part of the electrode discontinuity portion, dielectric ceramic particles with a size larger than a thickness of the dielectric ceramic layer is contained in a cross section perpendicular to a laminating plane of the laminated body,
the dielectric ceramic particles have the same crystal structure as the dielectric ceramic particles contained in the dielectric ceramic layers, and contact with at least one of the internal electrode layers which are opposite to each other with the dielectric ceramic layers sandwiched therebetween.

2. The multilayer ceramic electronic component of claim 1, characterized in that, the dielectric ceramic particles existing in a part of the electrode discontinuity portion contact with an end portion of a conductive component portion which is formed in the electrode discontinuity portion, and grain-grow to a size larger than the dielectric ceramic particles which form the dielectric ceramic layers.

3. The multilayer ceramic electronic component of claim 1, characterized in that, in the cross section perpendicular to the laminating plane of the laminated body, the ratio occupied by the electrode discontinuity portion having the dielectric ceramic particles in the internal electrode layers is 5% or more and 15% or less.

4. The multilayer ceramic electronic component of claim 2, characterized in that, in the cross section perpendicular to the laminating plane of the laminated body, the ratio occupied by the electrode discontinuity portion having the dielectric ceramic particles in the internal electrode layers is 5% or more and 15% or less.

* * * * *